US012617894B2

(12) United States Patent
Farrugia et al.

(10) Patent No.: US 12,617,894 B2
(45) Date of Patent: May 5, 2026

(54) POLYMER FIBER SCREEN SURFACE MODIFICATIONS FOR CATION EXCHANGE MEMBRANES

(71) Applicant: GENESEE VALLEY INNOVATIONS, LLC, Santa Clara, CA (US)

(72) Inventors: Valerie M. Farrugia, Oakville (CA); Michael S. Hawkins, Cambridge (CA)

(73) Assignee: GENESSE VALLEY INNOVATIONS, LLC, Santa Clara, CA (US)

( * ) Notice: Subject to any disclaimer, the term of this patent is extended or adjusted under 35 U.S.C. 154(b) by 732 days.

(21) Appl. No.: 17/650,073

(22) Filed: Feb. 4, 2022

(65) Prior Publication Data

US 2023/0250231 A1     Aug. 10, 2023

(51) Int. Cl.
| | |
|---|---|
| *C08G 65/48* | (2006.01) |
| *C25B 3/26* | (2021.01) |
| *C25B 13/08* | (2006.01) |

(52) U.S. Cl.
CPC ............... *C08G 65/48* (2013.01); *C25B 3/26* (2021.01); *C25B 13/08* (2013.01)

(58) Field of Classification Search
CPC .......... C08G 65/48; C25B 3/26; C25B 13/08; D06M 11/52; D06M 11/54; D06M 11/55
See application file for complete search history.

(56) References Cited

U.S. PATENT DOCUMENTS

| | | | | |
|---|---|---|---|---|
| 4,904,426 | A * | 2/1990 | Lundgard | B01D 69/08 |
| | | | | 210/500.28 |
| 4,992,485 | A * | 2/1991 | Koo | C08J 9/28 |
| | | | | 521/61 |
| 8,088,447 | B2 | 1/2012 | Chang et al. | |
| 2007/0117958 | A1* | 5/2007 | Mohwald | B01D 71/82 |
| | | | | 528/220 |
| 2009/0092880 | A1 | 4/2009 | Kim et al. | |
| 2010/0143823 | A1* | 6/2010 | Tanaka | H01M 8/0289 |
| | | | | 429/479 |
| 2010/0297530 | A1* | 11/2010 | Isomura | H01M 8/1088 |
| | | | | 429/492 |

(Continued)

FOREIGN PATENT DOCUMENTS

| | | |
|---|---|---|
| CN | 102898777 A | 1/2013 |
| CN | 104209023 A | 12/2014 |

(Continued)

OTHER PUBLICATIONS

Huang J. Appl. Polym. Sci. 2001 vol. 82, p. 2651-2660 (Year: 2001).*

(Continued)

*Primary Examiner* — Heidi R Kelley
*Assistant Examiner* — Adam J Berro
(74) *Attorney, Agent, or Firm* — MH2 Technology Law Group LLP

(57) ABSTRACT

A sulfonated polymer fiber screen and a method for fabricating the same is disclosed. For example, a composition may include a plurality of sulfonated polymer fibers. The sulfonated polymer fibers may include polyether ether ketone (PEEK) fibers or polyaryl ether ketone (PAEK) fibers that are contacted with an acid bath that includes a sulfur containing group.

18 Claims, 8 Drawing Sheets

(56) References Cited

U.S. PATENT DOCUMENTS

2014/0008585 A1    1/2014  Wu

FOREIGN PATENT DOCUMENTS

| | | |
|---|---|---|
| CN | 106496617 A | 3/2017 |
| CN | 108503877 A | 9/2018 |
| CN | 110656492 A | 1/2020 |
| CN | 114006019 A | 2/2022 |
| JP | 2020117097 A | 8/2020 |
| JP | 2020118231 A | 8/2020 |

OTHER PUBLICATIONS

Wang J. R. Soc. Interfaces 2019 v. 16:2018.0955, p. 1-10 (Year: 2019).*

Zhu ACS Appl. Mater. Interfaces 2019 v. 11 p. 27503-27511 (Year: 2019).*

Espacenet Translation of CN110656492A (Year: 2020).*

PubChem entry for Sulfuric Acid (Year: 2014).*

Chakrabarty, Dr Tina & Kumar, Mahendra & Rajesh, K.P. & Shahi, Vinod & Srinivasan, Natarajan. (2010). Nano-fibrous sulfonated poly(ether ether ketone) membrane for selective electro-transport of ions. Separation and Purification Technology. Oct. 13, 2010 (Oct. 13, 2010), 75. 174-182.

Manohar, Leela & Rahman, S.U. & Verma, Anil. (2012). Effect of solid polymer electrolyte on electrochemical reduction of CO2. Separation and Purification Technology. Jan. 4, 2012 (Jan. 4, 2012), 94. 131-137.

Extended EP Search Report for 23151777.2, Jun. 15, 2023, 9 pages.

* cited by examiner

FIG. 2

POLYMER FIBER SCREEN SURFACE MODIFICATIONS FOR CATION EXCHANGE MEMBRANES

The present disclosure relates generally to membrane electrode assemblies and relates more particularly to polymer fiber screens for gas diffusion electrodes used in various conversion systems.

BACKGROUND

The emission of greenhouse gases (GHGs) like $CO_2$ is causing depletion of the earth's ozone layer and the global temperature increase, leading to adverse effects on human health, agriculture, and water resources. To mitigate global climate change, worldwide interest has been focused onto the field of $CO_2$ capture and utilization (CCU), where electro-catalytic conversion of $CO_2$ into value-added chemicals and synthetic fuels is one of the attractive approaches. With appropriate electro-catalysts and reaction conditions including overpotential, reaction temperature, and electrolyte, etc., $CO_2$ can be electrochemically converted into various products such as carbon monoxide (CO), methane ($CH_4$), ethylene ($C_2H_4$), formic acid (HCOOH), methanol ($CH_3OH$) and ethanol ($C_2H_5OH$), etc.

At the current stage, electrochemical conversion of $CO_2$ into CO is one of the most promising reactions, due to its high technological and economic feasibility. In this reaction, syngas (CO and $H_2$) can be generated in an energy-efficient way and then used as feedstocks to produce synthetic hydrocarbons via Fischer-Tropsch synthesis process.

SUMMARY

According to aspects illustrated herein, there is provided a sulfonated polymer fiber screen and a method for fabricating the sulfonated polymer fiber screen. One disclosed feature of the embodiments is a composition comprising a plurality of sulfonated polymer fibers. Another disclosed feature of the embodiments is an article comprising a screen comprising a plurality of sulfonated polymer fibers.

Another disclosed feature of the embodiments is a method to fabricate a sulfonated polymer fiber screen. The method comprises contacting a plurality of unsulfonated polymer fibers with an acid comprising a sulfur containing group to sulfonate the plurality of unsulfonated polymer fibers in a sulfonation reaction and stopping the sulfonation reaction.

BRIEF DESCRIPTION OF THE DRAWINGS

The teaching of the present disclosure can be readily understood by considering the following detailed description in conjunction with the accompanying drawings, in which:

FIG. 2 illustrates example chemical structural formulas of the sulfonation of PEEK to SPEEK of the present disclosure;

To facilitate understanding, identical reference numerals have been used, where possible, to designate identical elements that are common to the figures.

DETAILED DESCRIPTION

The present disclosure broadly discloses a sulfonated poly(ether ether ketone) screen surface for cation exchange membranes and a method for producing the same. Cation exchange membranes can be used for electro-catalytic conversion of $CO_2$ into value-added chemicals and synthetic fuels. However, cation exchange membranes can be used for other applications as well, such as fuel cells, sewage disposal, sea water desalination, electrodialysis, chemical catalysis, gas separation, and the like.

Current cation exchange membranes can be fabricated from poly(ether ether ketone) (PEEK). PEEK is a high performance engineering thermoplastic that is known for its superb mechanical properties, good solvent resistance, and high thermo-oxidative stability. PEEK by itself though is highly hydrophobic and causes water droplets to have a very large contact angle. As a result, PEEK screens can be inefficient for passing water throughout the screen for cation exchange membranes.

One solution is to use an ionomer material called Nafion. However, Nafion is considered to be a high cost material that is not environmentally friendly.

The present disclosure provides a sulfonated PEEK (SPEEK) screen that performs as well as Nafion, but is much cheaper to produce and is more environmentally friendly than Nafion. The SPEEK screen can be fabricated from modification of the PEEK screen in a sulfuric acid bath. The SPEEK screens of the present disclosure provides a well-defined nano-phase separation within its domain due to a hydrophobic backbone from the aromatic rings and hydrophilic regions due to the sulfonic acid groups distributed along its backbone. The hydrophilic regions of the SPEEK screen can greatly reduce the contact angle of water droplets to the SPEEK screen, thereby allowing water to spread across the SPEEK surface.

The SPEEK screens formed by the acid treatment of the PEEK materials make the polymeric chain ionic and enable the transport of cations through the sulfonate groups ($-SO_3^-$). A SPEEK screen can function as a membrane capable of transferring protons from the anode of a fuel cell to the cathode along with acting as a barrier to the passage of electrons and other cross-leaks (e.g., gas) between the electrodes.

The SPEEK screens can be formed in-situ by applying an acid bath to PEEK screens. The PEEK screens can be dropped in an acid bath for several seconds to sulfonate the PEEK into the SPEEK screens. The ion exchange capacity of the SPEEK screens can be tuned based on an average diameter of the PEEK fibers used to make the PEEK screens, a porosity of the PEEK screens measured by a percentage of open area or average area of each opening in the PEEK screens, and/or a time in the acid bath. Thus, the present disclosure provides a low cost solution to modify PEEK screens to possess hydrophilic properties for use in a cation exchange membrane.

Figure 1:
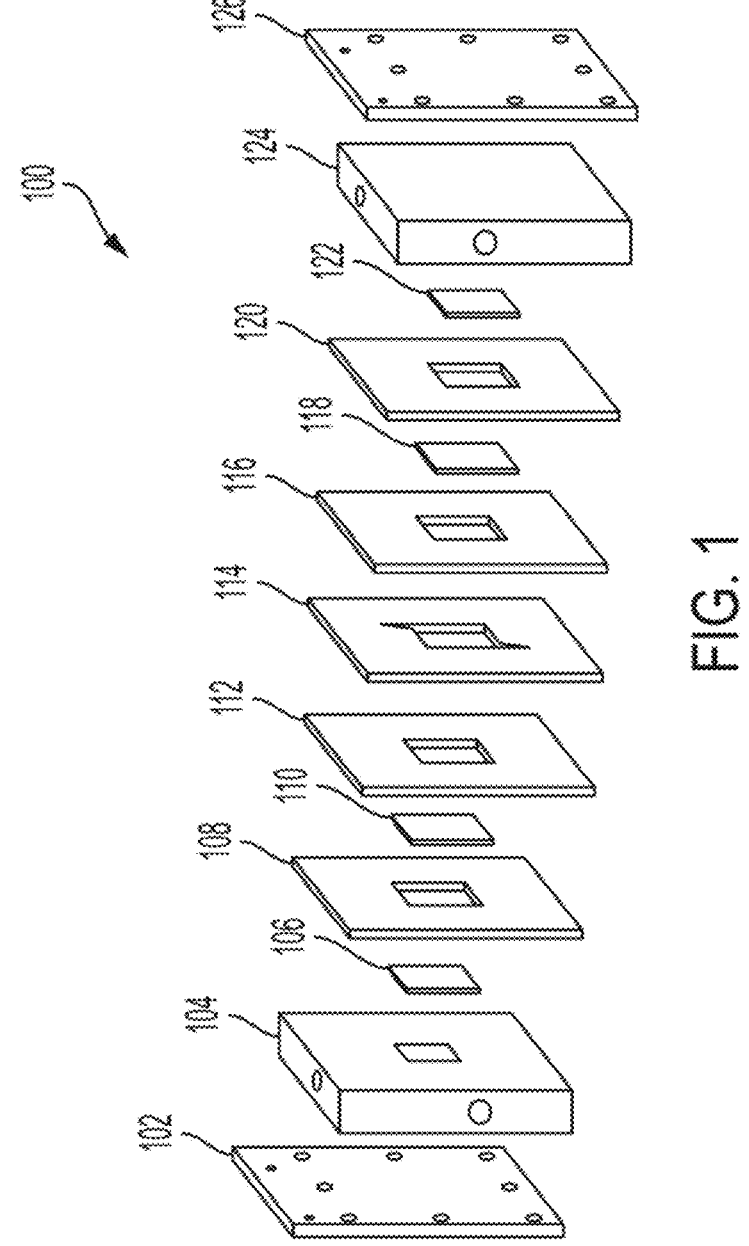
FIG. 1 illustrates an exploded block diagram of an example cation exchange assembly with a SPEEK screen of the present disclosure.

FIG. 1 illustrates an example cation exchange assembly 100 that includes the SPEEK screen of the present disclosure. The cation exchange assembly 100 may be part of a flow cell electro-catalytic converter that is used to convert a compound into different desirable compounds.

One example conversion that can be performed by the cation exchange assembly 100 is the conversion of carbon dioxide ($CO_2$) into carbon monoxide (CO) and hydrogen gas ($H_2$). However, it should be noted that the cation exchange assembly 100 may be used for electro-catalytic conversion of other types of compounds within the context of flow cell electro-catalytic converters. In addition, the cation exchange assembly 100 may be used in other applications such as fuel cells, sewage disposal applications, sea water desalination applications, electrodialysis, chemical catalysis, gas separation, and the like.

In one embodiment, the cation exchange assembly 100 includes a first end plate 102, a cathode flow field 104, a cathode gas diffusion electrode (GDE) 106, a first gasket 108, an anion membrane 110, a second gasket 112, a center flow compartment 114, a third gasket 116, a cation membrane 118, a fourth gasket 120, an anode GDE 122, an anode flow field 124, and a second end plate 126. In one embodiment, an anolyte may be fed through the anode flow field 124. The anolyte may flow through the anode GDE 122, the cation exchange membrane 118 and towards the center flow compartment 114. In one embodiment, the SPEEK screen can be used to fabricate the cation membrane 118.

In one embodiment, a catholyte may flow from the cathode flow field 104 through the cathode GDE 106 and through the anion membrane 110 towards the center flow compartment 114. The converted compounds and by-products may be fed out through the center flow compartment 114.

In instances where the cation exchange assembly 100 is an electro-catalytic conversion, the center flow compartment 114 may include a reference voltage. For example a cell potential may be applied to the cation exchange assembly 100 via the reference voltage to perform the electro-catalytic conversion.

In one embodiment, the cation membrane 118 may enable the transport of cations. The cation membrane 118 may act as a barrier to block cations while allowing anions to pass from the anode flow field 124 towards the center flow compartment 114.

In one embodiment, the SPEEK screen of the present disclosure may enable transport of the cations through the sulfonate groups ($-SO_3^-$) in the SPEEK screen. As noted above, PEEK material may be a relatively inexpensive material that provides superb mechanical properties, good solvent resistance, and high thermo-oxidative stability. However, PEEK materials are superhydrophobic. As a result, liquids may bead up on the PEEK material with a high contact angle, causing poor interaction through a screen fabricated with PEEK materials. In contrast, when the PEEK materials are modified in-situ in an acid bath, the SPEEK screen can provide a hydrophilic material that reduces the contact angle of the liquid and allows the liquid to spread across the SPEEK screen, thereby increasing the interaction of the liquid passing through the SPEEK screen.

Figure 8:
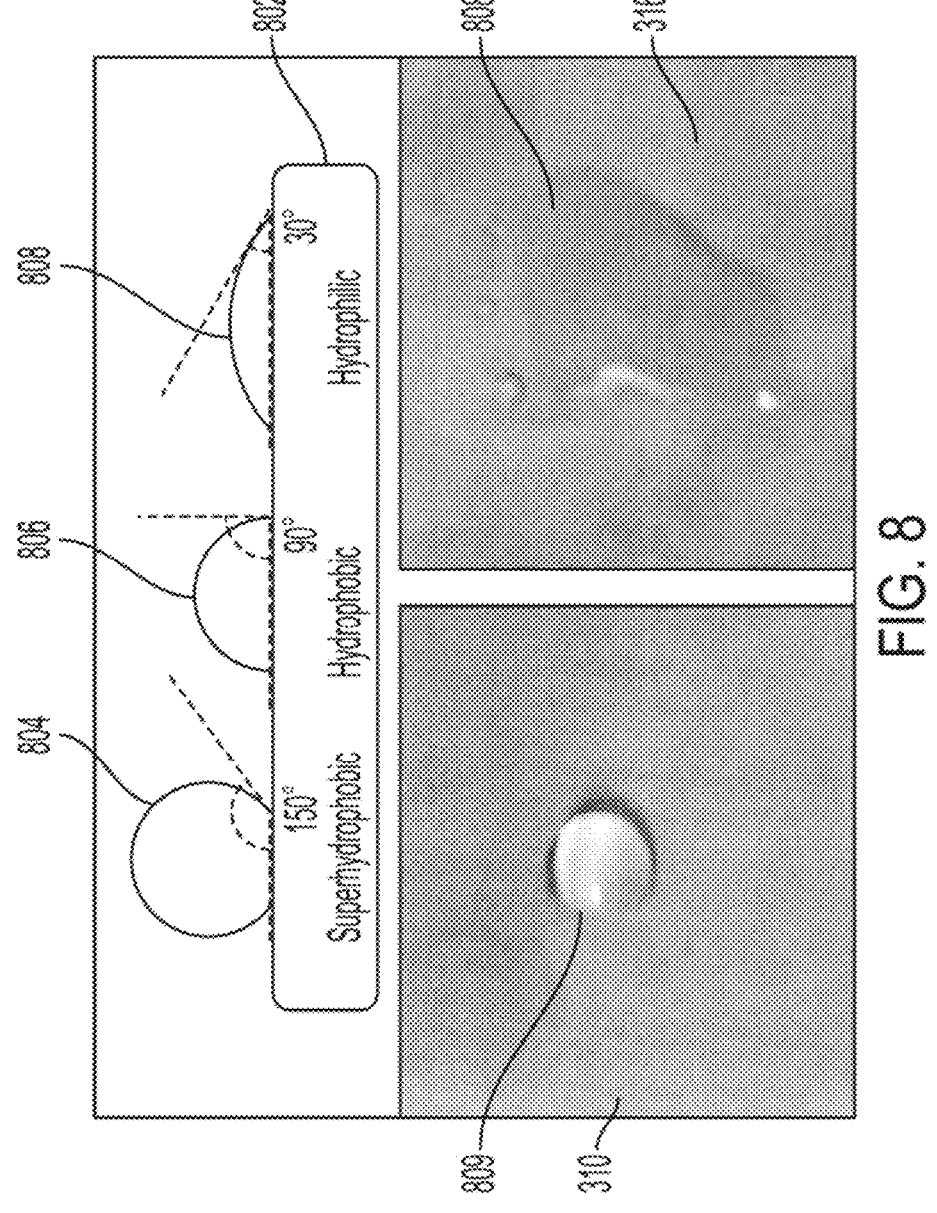
FIG. 8 illustrates example contact angles of water droplets to a PEEK screen and a SPEEK screen of the present disclosure.

FIG. 8 illustrates an illustration of the difference between superhydrophobic surfaces and hydrophilic surfaces. For example, a hydrophobic surface may cause liquid to form a dome shaped bead of liquid 806 with a surface 802 with a contact angle of approximately 90 degrees. A superhydrophobic surface may cause liquid to form a full bead or sphere of liquid 804 with the surface 802 with a contact angle of greater than 90 degrees or approximately 150 degrees. A hydrophilic surface may cause liquid to spread across the surface 802 to form a relatively flat liquid surface 808 with a contact angle of less than 90 degrees or approximately 30 degrees.

As shown in FIG. 8, a PEEK screen 310 may have a superhydrophobic surface that forms a full bead 804 when liquid contacts the PEEK screen 310. However, when the PEEK screen 310 is modified, as described herein, to form a SPEEK screen, the SPEEK screen can have a hydrophilic surface that forms a relatively flat liquid surface 808. In other words, the SPEEK screen allows the liquid to spread across the screen and interact with more surface area of the SPEEK screen, allowing the sulfonate groups of the SPEEK screen to block more of the cations and allow anions to pass through.

Figure 2:
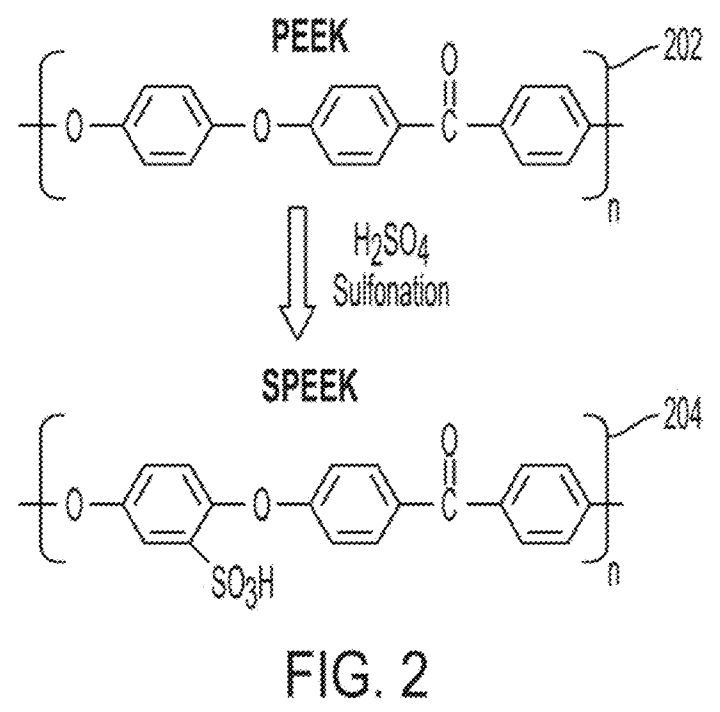

FIG. 2 illustrates an example of how the PEEK material 310 can be modified in-situ to form the SPEEK screen 316. For example, FIG. 2 illustrates a structural formula of PEEK 202. The PEEK 202 can be sulfonated in sulfuric acid ($H_2SO_4$) to form SPEEK 204, as shown in the structural formula of the SPEEK 204. As shown in FIG. 2, the aromatic backbone of the PEEK 202 can be chemically modified through an electrophilic substitution by the sulfonation with the sulfuric acid. The introduction of charged groups via the sulfuric acid may make the polymeric chains ionic to enhance the hydrophilicity of the PEEK material 310.

Although the examples described herein relate to PEEK materials 310, it should be noted that other types of polymers or any type of unsulfonated polymer selective barrier material can also be used to form sulfonated polymer screens similar to the SPEEK screens described herein. For example, polyaryl ether ketone (PAEK) fibers can also be used. The PAEK fibers may have similar dimensions and properties to the PEEK fibers to be processed for sulfonated PAEK screens.

In one embodiment, the unsulfonated polymer selective barrier material may be presented as a sheet or roll. The unsulfonated polymer selective barrier material may then be cut to size or adapted for a particular usage to form a screen of the unsulfonated polymer selective barrier.

Figure 3:
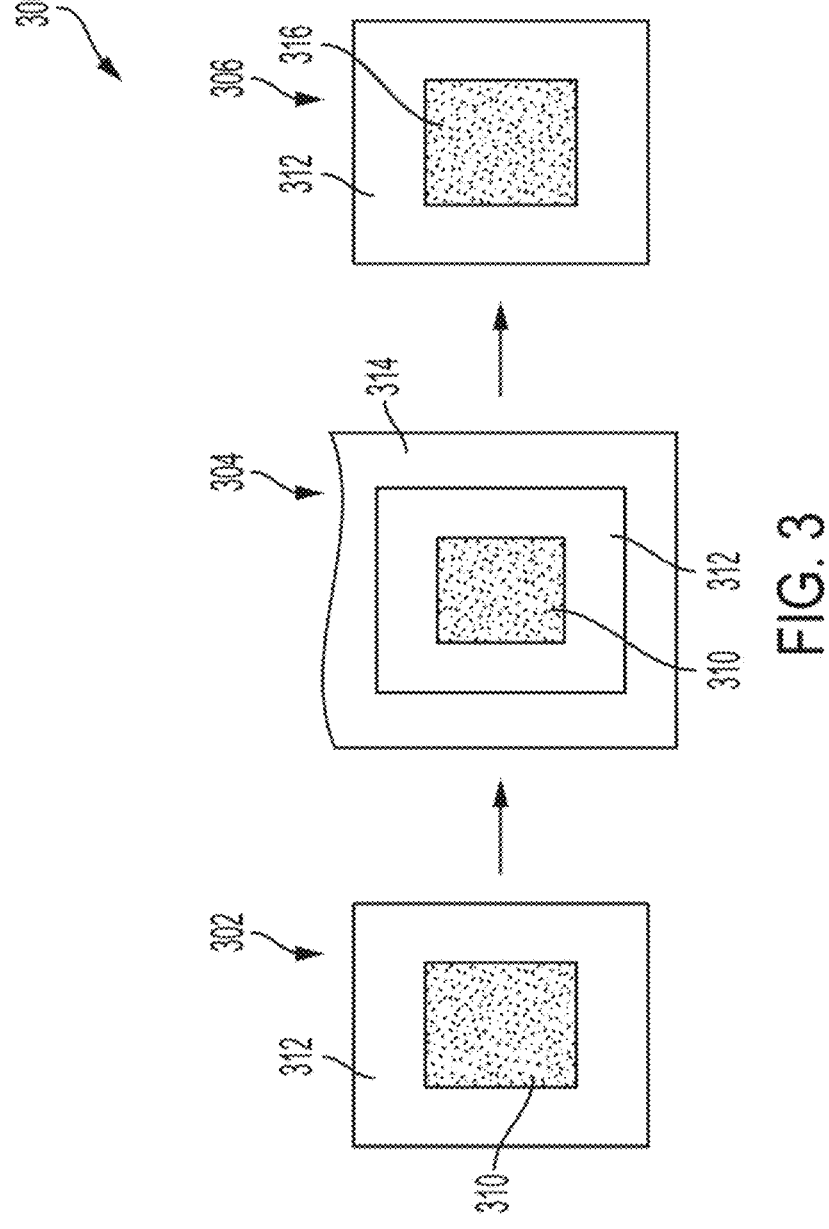
FIG. 3 illustrates an example process flow of the sulfonation of PEEK to SPEEK of the present disclosure.

FIG. 3 illustrates an example process flow 300 of forming the SPEEK screens 316 in-situ. In an example, at block 302, the PEEK material 310 may be provided in a mesh screen form. For example, the mesh screen form may include intertwined or woven fibers of the PEEK material 310.

The PEEK material 310 may be coupled to a support structure 312. The support structure may include two plates with an opening that can be secured together against the perimeter of the PEEK material 310.

At block 304, the PEEK material 310 may be dipped into an acid bath 314. The acid bath 314 may be an acid bath containing a sulfur containing group. For example, the acid bath may include sulfuric acid, sulfonic acid (e.g., methane sulfonic acid, ethane sulfonic acid, and the like), sulfurous acid, chlorosulfonic acid, trimethylsilylsulfonyl chloride, or any other type of acid that includes sulfur. In one embodiment, the acid bath may be a sulfuric acid bath having a concentration of over 80% sulfuric acid. In one embodiment, the sulfuric acid bath may have a concentration greater than 90% of sulfuric acid. In one embodiment, the sulfuric acid bath may have a concentration of greater than 95% of sulfuric acid.

The PEEK material 310 may be dipped in the acid bath for an amount of time sufficient to sulfonate the PEEK screen into the SPEEK screen 316 and maintain a mesh structure of the PEEK screen. For example, if the PEEK material 310 is placed in the acid bath for too long, the structural integrity of the mesh pattern may be lost. The PEEK material 310 may simply disintegrate in the acid bath 314. In an example, the amount of time may be less than 5 seconds or between 2-5 seconds.

The amount of time may vary on several different parameters, as discussed in further details below. For example, the amount of time may be longer when using a less concentrated acid. For example, the PEEK material 310 may be dipped in the acid bath for up to 10 seconds when using a sulfuric acid bath having a lower concentration of 80% sulfuric acid.

At block 306, the PEEK screen is removed from the acid bath 314 and the SPEEK screen 316 is formed. The SPEEK screen 316 may be quenched in cold water and rinsed in deionized water. The SPEEK screen 316 may be removed from the support structure 312 and deployed as part of the cation membrane 118 in the cation exchange assembly 100, described above.

Figure 4:
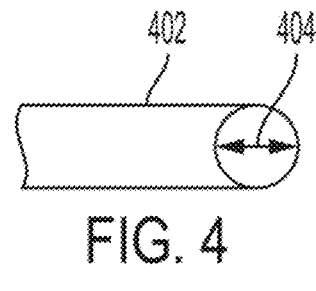
FIG. 4 illustrates an example of fiber of the PEEK screen and an illustration of a diameter dimension of the present disclosure.

Referring back to the block 304, the amount of time that the PEEK material 310 is dipped in the acid bath 314 may be a function of several different parameters that include an average diameter of the fibers of the PEEK material 310 and porosity of the PEEK material 310. FIG. 4 illustrates an example fiber 402 of the PEEK material 310. A diameter of the fiber 402 may be measured as shown by a line 404.

Figure 5:
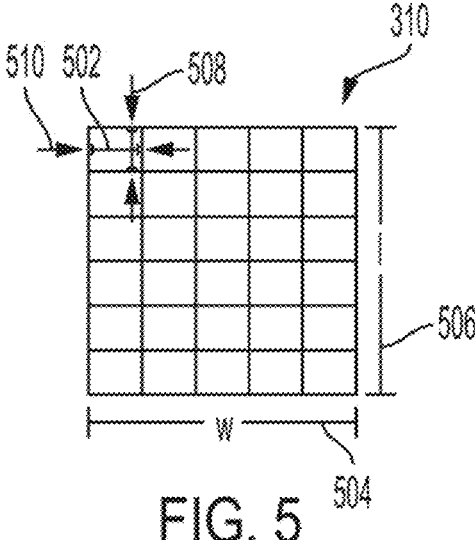
FIG. 5 illustrates an example PEEK screen and an illustration to define average porosity.

FIG. 5 illustrates an example of how the porosity of the PEEK material 310 may be calculated. The porosity of the PEEK material 310 may be measured as a percentage of open area of the PEEK material 310 relative to the entire area of the PEEK material 310. For example, the entire area of the PEEK material 310 may be measured by a product of the width 504 and a length 506 of the PEEK material 310.

The PEEK material 310 may be provided in a mesh screen form, as noted above. The mesh screen may be comprised of a plurality of openings 502. Each opening 502 may have an open area measured by a product of a width 510 and a length 508 of the opening 502. The area of each opening 502 may be summed up to calculate the open area. The open area divided by the entire area of the PEEK material may provide the percentage of opening in the PEEK material 310, or the porosity.

In an example, the amount of time may be a function of the diameter 404 of each fiber 402, a porosity of the PEEK material 310, and a concentration of the acid bath. The larger the diameter 404, the longer the amount of time may be. The larger the porosity of the PEEK material 310, the shorter the amount of time may be. Conversely, the weaker the concentration of acid in the acid bath, the longer the amount of time may be.

Figure 6:
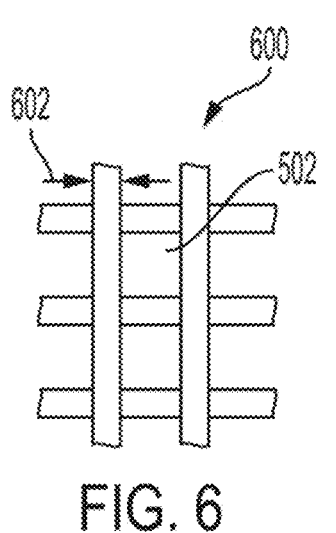
FIG. 6 illustrates an example PEEK screen with fibers having a first diameter and a first sized opening of the present disclosure.
Figure 7:
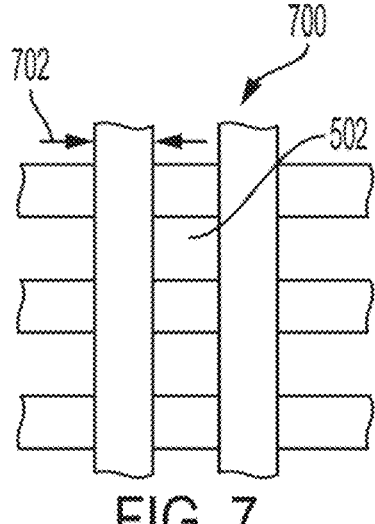
FIG. 7 illustrates an example PEEK screen with fibers having a second diameter and the first sized opening of the present disclosure.

FIGS. 6 and 7 illustrate how the diameter and porosity can be related to one another. For example, FIG. 6 illustrates an example mesh screen 600 with openings 502 formed by fibers with a diameter 602. In an example, the diameter of the fiber could be increased or decreased to change a size or area of the openings 502.

However, as shown in FIG. 7, the size of the openings 502 may be kept the same even if the diameter of the fiber is increased. For example, an example mesh screen 700 may have fibers with a diameter 702 that is larger than the diameter 602 of the mesh screen 600. However, the fibers in the mesh screen 700 may be woven further apart such that the area of the openings 502 in the mesh screen 700 is the same as the area of the openings 502 in the mesh screen 600. Thus, the amount of time the PEEK material 310 is placed in the acid bath 314 may be a function of a diameter 404 of each fiber 402 and a porosity of the PEEK material 310.

In an example, the amount of time may be between 2 to 5 seconds as noted above. The amount of time may apply to a PEEK material 310 that has fibers with an average diameter of between 0.0015 and 0.0050 inches. In an example, the average diameter may be approximately 0.0028 inches.

In an example, the porosity of the PEEK material 310 may be between 20 percent and 60 percent. In an example, the porosity may be approximately 22 percent. In examples, it was found that a PEEK material 310 with fibers having a diameter of approximately 0.0028 inches and a porosity of 22% was more resilient to the acid bath 314 than a PEEK material 310 with fibers having a diameter of approximately 0.0015 inches and a porosity of 56%.

Figure 9A:
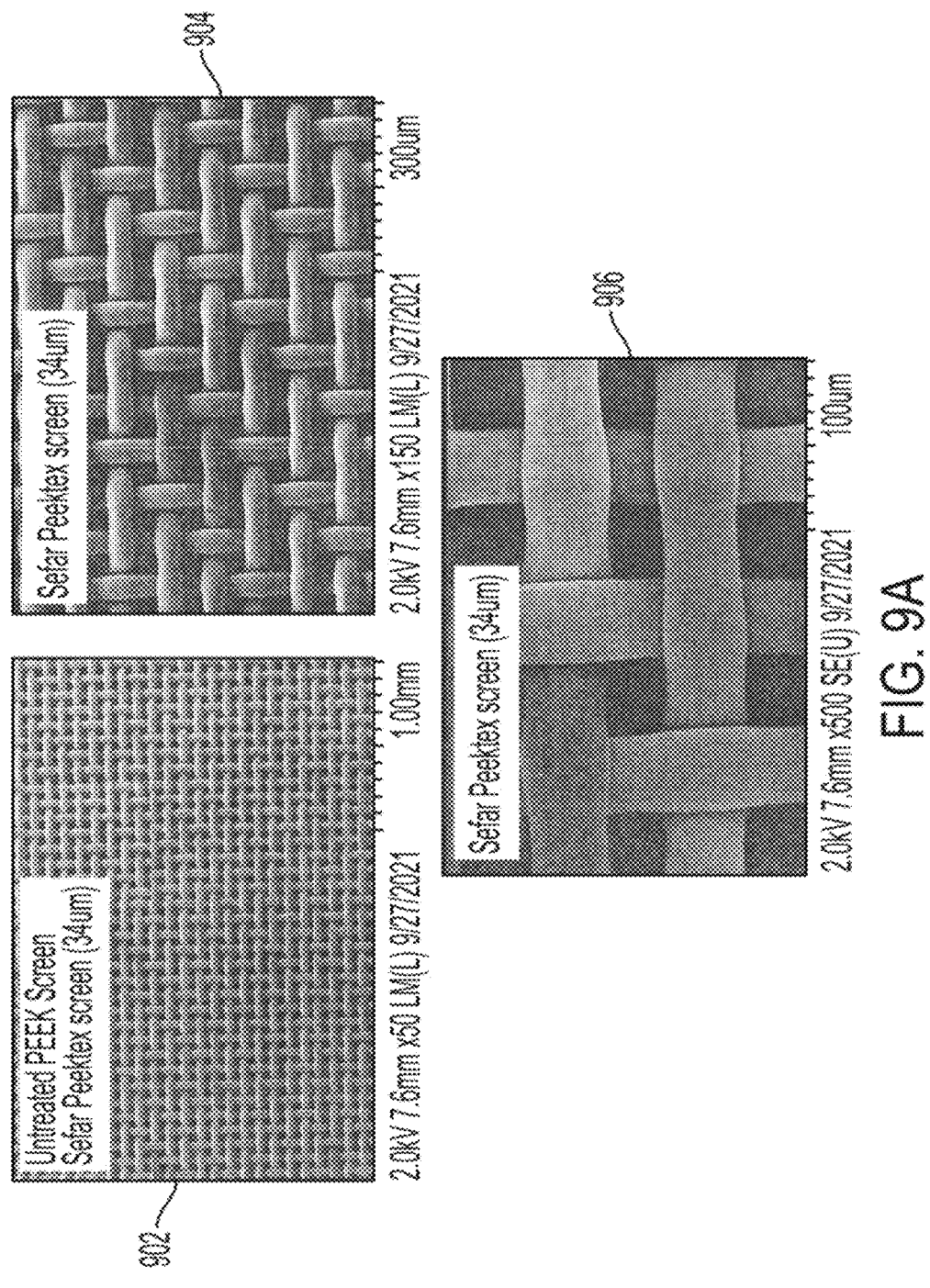
FIGS. 9A-9B illustrates example SEM images of various PEEK screens before and after sulfonation of the present disclosure.
Figure 9B:
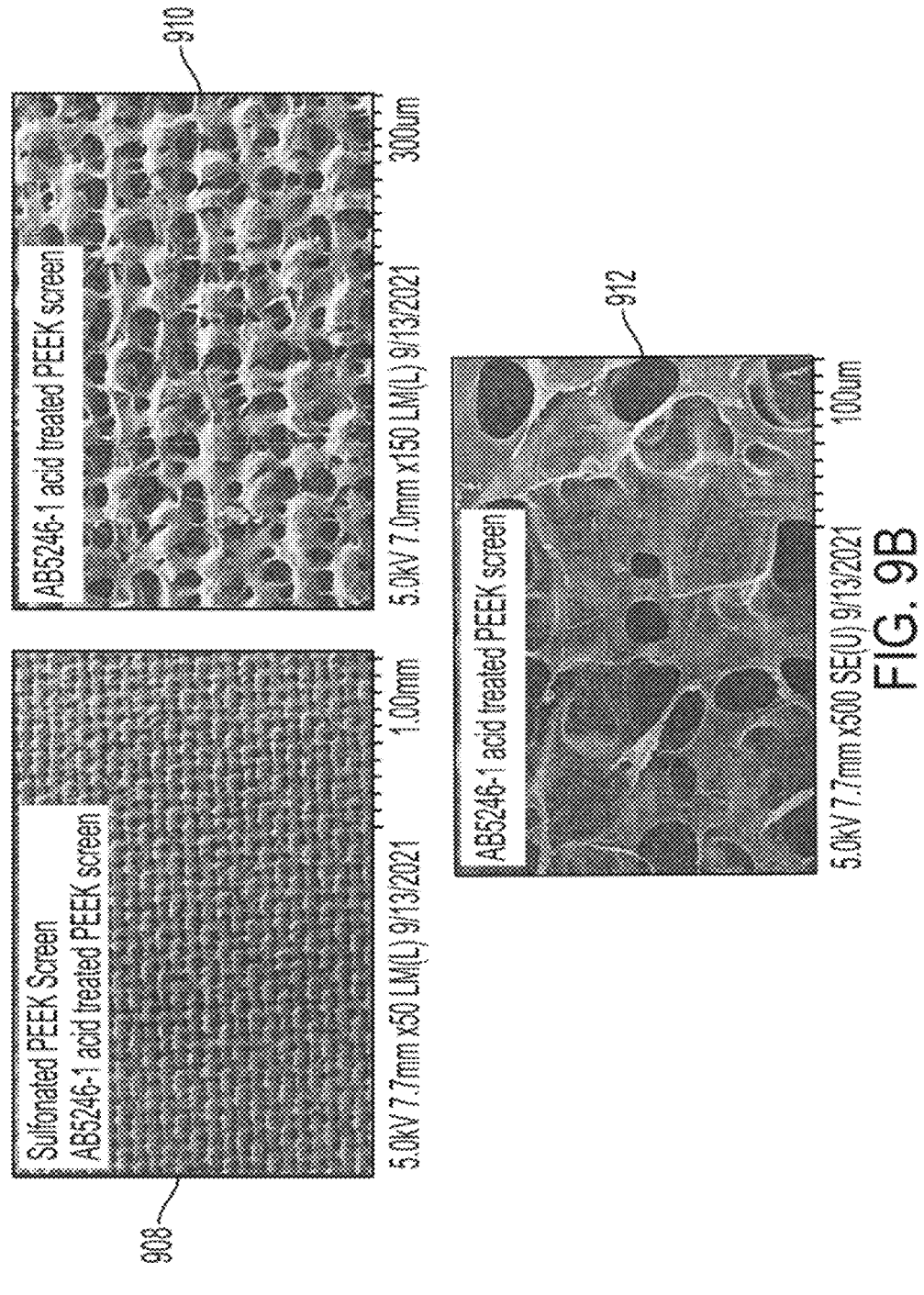

FIGS. 9A-9B illustrate example scanning electron microscope (SEM) images of the PEEK material 310 before and after sulfonation in the acid bath 314. Images 902, 904, and 906 illustrate views with increased magnification (image 902 with least amount of magnification and image 906 with the most amount of magnification) of the PEEK material 310 before being sulfonated. As can be seen in the images 902, 904, and 906, the fibers of the PEEK material 310 have a well-defined structure and shape.

Images 908, 910 and 912 illustrate views of the SPEEK screen formed after the PEEK material 310 is sulfonated. The images 908, 910, and 912 correspond to the same magnification as the before images 902, 904, and 906, respectively.

As can be seen in the images 908, 910, and 912, the sulfonation of the PEEK material 310 shows a significant change in the surface morphology of the fibers. The sulfonation of the PEEK material 310 creates an almost porous structure in the fibers with increased roughness. The fibers also show signs of dissolution with strands of fibril artifacts within. Thus, placing the PEEK material 310 in the acid bath for too long a period of time may cause disintegration of the PEEK material 310 or a collapse of the mesh structure.

The performance of the SPEEK screen 316 was measured based on ion exchange capacity (IEC). IEC provides information on the density of ionizable functional groups present in the membrane matrix. IEC measures the number of counter ions exchangeable in the SPEEK screen 316. IEC can be measured for the SPEEK screen 316 and may be determined by titrimetric analysis.

In an example, the SPEEK screen 316 was protonated after being washed for 24 hours in 1 molar (M) hydrochloric acid (HCl). The SPEEK screen 316 was then immersed into 0.1 M sodium chloride (NaCl) solution for 24 hours at ambient temperature. The protons are released into solution and titrated by a standardized 0.05 M sodium hydroxide (NaOH) solution. The IEC of the SPEEK screen 316 is calculated using the Equation (1) below:

$$IEC=(C_{NaOH} \times V_{NaOH})/W_{dry}, \quad \text{Equation (1)}$$

where $C_{NaOH}$ (measured in moles per Liter (mol/L) and $V_{NaOH}$ (measured in L) are the concentration and volume, respectively, of NaOH solution required to neutralize the residual solution, and $W_{dry}$ is the weight of the dry SPEEK screen 316 in its protonic form. IEC is defined as the milliequivalents of H+ per weight of dry polymer or membrane (e.g., the SPEEK screen 316). The units of IEC can be abbreviated as milliequivalents per gram or meq/g.

The IEC of a membrane may dictate the hydrophilicity, and therefore, the amount of water in the membrane. The proton conductivity increases with increased IEC due to sulfonation (as seen by the SPEEK screen 316 of the present disclosure) since water attaches to the sulfonic acid groups and allows water penetration through the membrane via water channels, also encouraging the passage of protons.

The IEC for the SPEEK screen 316 was found to be between 0.10 to 0.20 meq/g, as shown in Table 1. Table 1, below, illustrates a comparison of the IEC values of different PEEK materials 310 compared to the SPEEK screen 316 formed from the PEEK materials. PEEK screen S1 used the example with 0.0015 inch diameter fibers with 56% porosity, and PEEK screen S2 used the example with 0.0028 inch diameter fibers with 22% porosity. SPEEK S1 was the sulfonated version of screen S1, and SPEEK S2 was the sulfonated version of screen S2.

TABLE 1

| IEC DATA | | | |
| --- | --- | --- | --- |
| | IEC (meq/g) | Average | Std. De. |
| PEEK S1 | 0.0000 | | |
| PEEK S2 | 0.0045 | 0.0022 | 0.0032 |
| SPEEK S1 | 0.1485 | | |
| SPEEK S2 | 0.1676 | 0.1581 | 0.0135 |

Thus, it can be seen that the sulfonated SPEEK screen 316 of the present disclosure provides excellent IEC values that can be used as the cation membrane 118 in the cation exchange assembly 100 described above, as compared to the PEEK materials 310. In addition, it can be seen that the SPEEK screen 316 with the larger diameter fibers and lower porosity provided better IEC values.

Figure 10:
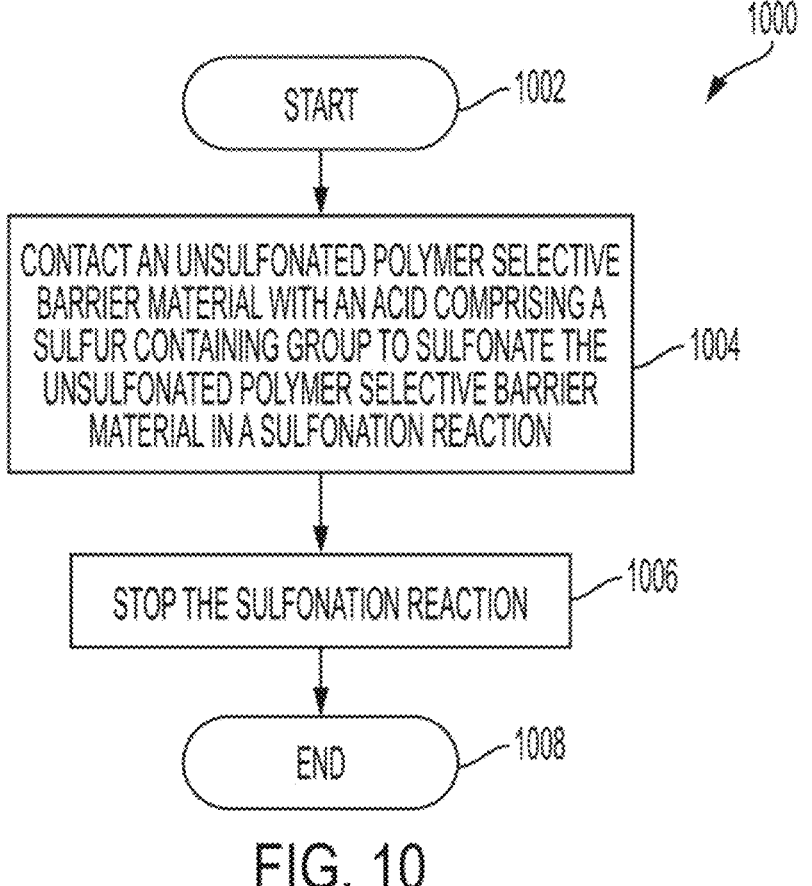
FIG. 10 illustrates an example flowchart of a method for fabricating the sulfonated polymer screens of the present disclosure.

FIG. 10 illustrates a flowchart of an example in-situ method 1000 for fabricating a sulfonated polymer screen of the present disclosure. In one embodiment, one or more blocks of the method 1000 may be performed by various tools or machines under the control of a central controller or processor or in combination with manually performed steps to prepare the sulfonated polymer screen described herein.

At block 1002, the method 1000 begins. At block 1004, the method 1000 contacts an unsulfonated polymer selective barrier material with an acid comprising a sulfur containing group to sulfonate the unsulfonated polymer selective barrier material in a sulfonation reaction. The sulfonation reaction may create a sulfonated polymer screen. The unsulfonated polymer selective barrier material may comprise fibers of polyether ether ketone (PEEK) or polyaryl ether ketone (PAEK).

For example, the unsulfonated polymer selective barrier material may be provided in a mesh or screen structure that is formed by intertwined or woven fibers. The mesh of unsulfonated polymer selective barrier material can be cut to size for a cation exchange membrane and secured in the support structure. The mesh of unsulfonated polymer selective barrier material may then be coupled to a support structure to be contacted with the acid.

The unsulfonated polymer selective barrier material may have a particular average diameter and porosity or open area percentage. In an example, the fibers may have an average diameter between 0.0015 inches and 0.0050 inches. In an example, the polymer screen may have a porosity of between 20 percent to 60 percent.

In one embodiment, the unsulfonated polymer selective barrier material may be contacted with an acid by dipping the unsulfonated polymer selective barrier material into an acid bath. As noted above, an example of the unsulfonated polymer fibers may be a PEEK screen. The PEEK screen may be dipped into the acid bath for an amount of time sufficient to sulfonate the PEEK screen in-situ into the sulfonated PEEK (SPEEK) screen and to maintain a mesh structure of the PEEK screen. For example, the amount of time may be between 2 to 5 seconds, or less than 5 seconds for PEEK screens with fibers having an average diameter between 0.0015 inches and 0.0050 inches and a porosity between 20 percent to 60 percent.

In one embodiment, the PEEK acid bath may be a sulfuric acid bath. The sulfuric acid bath may have a concentration of greater than 95% sulfuric acid. However, as noted above, the acid may include any type of acid that includes a sulfur containing group such as sulfuric acid, sulfonic acid (e.g., methane sulfonic acid, ethane sulfonic acid, and the like), sulfurous acid, chlorosulfonic acid, trimethylsilylsulfonyl chloride, or any other type of acid that includes sulfur.

At block 1006, the method 1000 stops the sulfonation reaction. For example the sulfonation reaction may be stopped by quenching the reaction. For example, the sulfonated polymer screen may be quenched in cold water immediately after being removed from the acid bath to stop the sulfonation reaction and maintain the structural integrity of the mesh pattern. The quenching may also include a neutralization step to neutralize any remaining acid on the sulfonated polymer screen to stop the sulfonation reaction.

The sulfonated polymer screen can be further rinsed in deionized water. In one embodiment, the sulfonated polymer screen can be protonated in 1 M HCl for 24 hours. The sulfonated polymer screen can then be deployed as part of a cation membrane for a cation exchange assembly. At block 1008, the method 1000 ends.

The terms "membrane," and "screen" ("mesh" & "screen" have the same meaning) indicate that the selective barrier material has been sized or adapted for a particular usage.

Embodiments of the present disclosure include the following: in-situ sulfonation reaction of an unsulfonated polymer selective barrier material sized or adapted for a particular usage (e.g., screen, membrane, etc.) to result in a sulfonated polymer selective barrier material, and not in-situ sulfonation reaction of an unsulfonated polymer selective barrier material (that may be larger in size than needed for a particular usage) to result in a sulfonated polymer selective barrier material. Before being sized or adapted for a particular usage, the selective barrier material can be in the form of, for example, a sheet, roll, etc.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A composition, comprising:
   a plurality of sulfonated polymer fibers, wherein the plurality of sulfonated polymer fibers comprises sulfonated polyether ether ketone (PEEK) fibers or sulfonated polyaryl ether ketone (PAEK) fibers, wherein the plurality of sulfonated polymer fibers is created by contacting unsulfonated polyether ether ketone fibers or unsulfonated polyaryl ether ketone fibers with an acid bath comprising methane sulfonic acid, ethane sulfonic acid, sulfurous acid, or a combination thereof for between 2 to 5 seconds.

2. The composition of claim 1, wherein the sulfonated PEEK fibers have an average diameter of between 0.0015 inches and 0.0050 inches.

3. The composition of claim 1, wherein the sulfonated PEEK fibers are arranged in a screen with open spaces between the sulfonated PEEK fibers.

4. The composition of claim 3, wherein the screen comprises an open area of between 20 percent to 60 percent.

5. The composition of claim 4, wherein the screen comprises an open area of approximately 22 percent.

6. An article, comprising:

a sulfonated polymer selective barrier material, wherein the sulfonated polymer selective barrier material comprises sulfonated polyether ether ketone (PEEK) fibers or sulfonated polyaryl ether ketone (PAEK) fibers, wherein the sulfonated polymer selective barrier material is created by contacting unsulfonated polyether ether ketone fibers or unsulfonated polyaryl ether ketone fibers with an acid bath comprising methane sulfonic acid, ethane sulfonic acid, sulfurous acid, or a combination thereof for between 2 to 5 seconds.

7. The article of claim 6, wherein the sulfonated polymer selective barrier material has an ion exchange capacity of between about 0.10 to about 0.20 milliequivalents per gram (meq/g).

8. A method, comprising:

contacting an unsulfonated polymer selective barrier material with an acid bath comprising a sulfur containing group to sulfonate the unsulfonated polymer selective barrier material in a sulfonation reaction, wherein the unsulfonated polymer selective barrier material comprises polyether ether ketone (PEEK) fibers or polyaryl ether ketone (PAEK) fibers, and wherein the unsulfonated polymer selective barrier material is contacted with the acid bath comprising methane sulfonic acid, ethane sulfonic acid, sulfurous acid, or a combination thereof for between 2 to 5 seconds; and stopping the sulfonation reaction.

9. The method of claim 8, wherein the unsulfonated polymer selective barrier material is arranged as a cation exchange membrane with open spaces and contacted with the acid bath in-situ.

10. The method of claim 9, wherein the cation exchange membrane comprises an open area of between about 20 percent to about 60 percent.

11. The method of claim 10, wherein the cation exchange membrane comprises an open area of approximately 22 percent.

12. The method of claim 8, wherein the unsulfonated polymer selective barrier material comprises the polyether ether ketone (PEEK) fibers or the polyaryl ether ketone (PAEK) fibers having an average diameter of between 0.0015 inches and 0.0050 inches.

13. The method of claim 12, wherein the PEEK fibers or PAEK fibers have an average diameter of 0.0028 inches.

14. The method of claim 8, wherein the acid bath further comprises sulfuric acid.

15. The method of claim 14, wherein the sulfuric acid comprises greater than 80 percent concentration of sulfuric acid.

16. The composition of claim 1, wherein the unsulfonated polymer selective barrier material is contacted with the acid bath to tune an ion exchange capacity for use in a cation exchange membrane.

17. The article of claim 6, wherein the unsulfonated polymer selective barrier material is contacted with the acid bath to tune an ion exchange capacity for use in a cation exchange membrane.

18. The method of claim 8, wherein the unsulfonated polymer selective barrier material is contacted with the acid bath to tune an ion exchange capacity for use in a cation exchange membrane.

* * * * *